United States Patent [19]
Ecarnot

[11] Patent Number: 6,129,343
[45] Date of Patent: Oct. 10, 2000

[54] GAS SPRING WITH SPEED REGULATION

[75] Inventor: Eric Ecarnot, Serre les Sapins, France

[73] Assignee: Draftex Industries Limited, Edinburgh, United Kingdom

[21] Appl. No.: 09/081,303

[22] Filed: May 19, 1998

[30] Foreign Application Priority Data

May 29, 1997 [GB] United Kingdom .................... 9710978

[51] Int. Cl.⁷ ....................................................... F16F 5/00
[52] U.S. Cl. .................. 267/64.11; 188/281; 188/322.22
[58] Field of Search ..................................... 188/251, 287, 188/322.13, 322.22, 322.15, 313; 267/64.11, 64.15

[56] References Cited

U.S. PATENT DOCUMENTS

| | | | |
|---|---|---|---|
| 5,219,414 | 6/1993 | Yamaoka | 188/322.15 |
| 5,560,456 | 10/1996 | Koch et al. | 267/64.12 |
| 5,799,759 | 9/1998 | Koch | 267/64.12 |

FOREIGN PATENT DOCUMENTS

| | | |
|---|---|---|
| 0 209 909 | 1/1987 | European Pat. Off. . |
| 0 410 920 | 1/1991 | European Pat. Off. . |
| 2 317 563 | 7/1975 | France . |
| 4 000 865 | 7/1991 | Germany . |
| 2 058 287 | 4/1981 | United Kingdom . |
| 2 231 385 | 11/1990 | United Kingdom ............. F16F 9/48 |

*Primary Examiner*—Robert J. Oberleitner
*Assistant Examiner*—Robert A. Siconolfi
*Attorney, Agent, or Firm*—Leydig, Voit & Mayer, Ltd.

[57] ABSTRACT

A gas spring comprising a cylindrical body in which a main piston is slidable and carries a piston rod extending in sealed manner outwardly of the cylinder. The main piston includes a bore connecting with a labyrinthine passageway. The interior of the cylinder contains a fluid comprising gas under pressure and (optionally) some oil. The gas urges the piston rod outwardly of the cylinder. During the corresponding travel of the piston, the fluid transfers from one side of the piston to the other in a controlled manner through the bore and the passageway to allow relatively rapid travel. However, when the main piston comes into contact with a second piston, freely slidable on the piston rod and biassed towards the main piston by a compression spring, this contact closes off the end of the fluid passageway, and fluid can now only transfer through the main piston by passing through a narrow radial channel, thus reducing the speed of outward travel of the piston rod. During this further outward travel, the main piston drives the second piston towards an abutment against the force of the spring.

22 Claims, 7 Drawing Sheets

GAS SPRING WITH SPEED REGULATION

BACKGROUND OF THE INVENTION

The invention relates to a gas spring having speed regulation. Various forms of gas spring are known and may be used, for example, for raising or opening doors, such as hatchback doors, and lids in motor vehicle bodies for example, though they may be used in many other applications. In such springs, a cylinder is at least partially filled with gas which tends to expel a piston rod. It is desirable to be able to regulate the speed of movement of the piston rod so as to be able to achieve a desired speed of operation but with appropriate deceleration at the end of the travel of the piston rod.

BRIEF SUMMARY OF THE INVENTION

According to the invention, there is provided a gas spring, comprising a cylindrical body with a hollow interior containing a fluid which at least partly includes gas under pressure, first piston means slidable within the interior and dividing the interior into a first chamber on one side of the first piston means and a second chamber on the opposite side of the piston means through which a piston rod carried by the first piston means passes and extends sealingly outwardly of the cylindrical body such that the gas pressure within the cylindrical body tends to move the piston rod outwardly of the cylindrical body, means defining a fluid passageway past the first piston means for allowing gas pressure to transfer from the second chamber to the first chamber at a predetermined controlled rate during a first part of the outward travel of the piston rod, the fluid passageway having an opening in a face of the first piston means in the second chamber, control means within the cylindrical body having a face into contact with which the said face of the piston means moves during a second part of the outward travel of the piston rod so as to close the opening except for a subsidiary passage of reduced and predetermined cross-section which is open to the fluid passageway and which is not closed off by the contact between the said faces, whereby to allow reduced speed of travel of the piston rod during the second part of its outward travel.

According to the invention, there is further provided a gas spring, comprising a cylindrical body having a hollow interior, first piston means slidable within the cylindrical body between first and second ends thereof and dividing the cylindrical body into a first chamber and a second chamber, a piston rod attached to the first piston means and extending through the second chamber and sealingly outwardly of the cylindrical body through the second end thereof, the cylindrical body containing fluid which at least partly includes gas under pressure and which tends to move the piston rod in a direction outwardly of the cylindrical body, the first piston means including means defining a first fluid passageway connecting the first and second chambers to permit transfer of the fluid from the second chamber to the first chamber as the gas pressure moves the piston rod outwardly of the cylindrical body, second piston means mounted on and slidable relative to the piston rod in the second chamber and biassed away from the second end of the cylindrical body so as to divide the second chamber into first and second parts thereof which are interconnected through or around the second piston means, the first fluid passageway having an opening in a face of the first piston means which opens into the first part of the second chamber to allow relatively rapid transfer of fluid from the second chamber into the first chamber during an initial part of the outward movement of the piston rod, the effective cross-sectional area of this opening being reduced to a predetermined size when the said face of the first piston means comes into contact with the second piston means so as to reduce the rate of transfer of fluid from the second chamber to the first chamber during the second part of the outward movement of the piston rod, and valve means carried by the first piston means for opening a second fluid passageway when the piston rod moves inwardly of the cylindrical body to allow relatively free flow of fluid from the first chamber to the second chamber when the piston rod moves in the inward direction.

DESCRIPTION OF THE DRAWINGS

Gas springs embodying the invention will now be described, by way of example only, with reference to the accompanying diagrammatic drawings in which.

DESCRIPTION OF PREFERRED EMBODIMENTS

Figure 1:
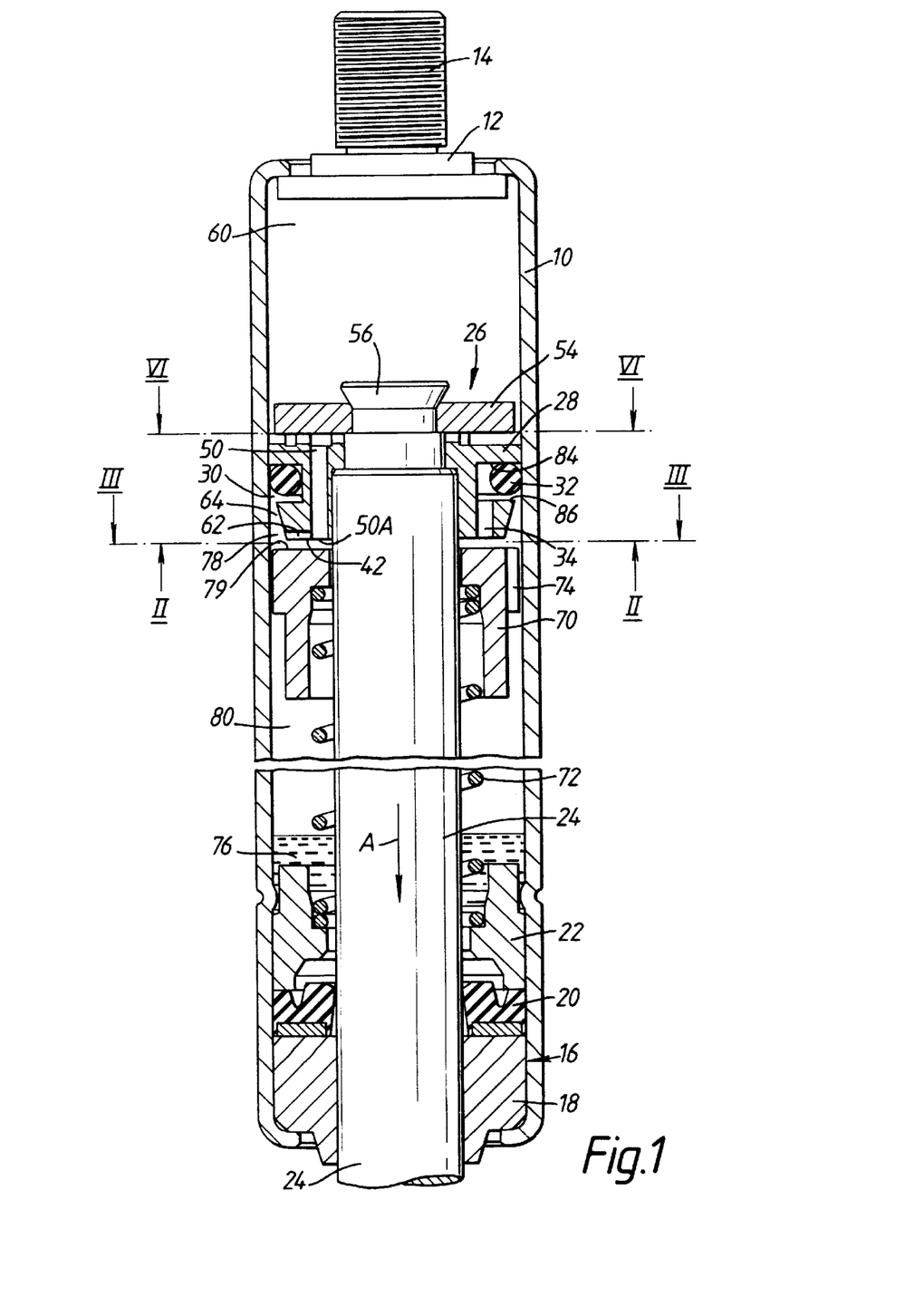
FIG. 1 is a longitudinal section through one of the gas springs on the line I—I of FIG. 2.

The gas spring of FIG. 1 comprises a cylinder 10 made of suitably strong material, such as metal. It is closed off at one end by an end plate 12 supporting a fixture 14. It is closed off at the other end by a sealing assembly indicated generally at 16. The sealing assembly comprises a guide 18, a seal 20 and an abutment member 22. A piston rod 24 slidably passes through the sealing assembly 16, the seal 20 providing a gas and liquid-tight seal around the periphery of the piston rod 24.

The piston rod 24 carries a piston 26 which comprises a piston body 28 having a peripheral groove 30 in which is situated a sealing ring 32. The width of the groove 30 (that is, its dimension measured axially of the cylinder 10) is greater than the thickness (the cross-sectional diameter) of the sealing ring 32.

The piston body 28 is provided with four passageways 34, 36, 38 and 40 (see FIG. 2 also) which extend from the end face 42 of the piston body into the groove 30. The face 42, however, has portions 44, 46 and 48 which are recessed, in an axial direction, with respect to the remainder of the face 42.

Figure 6:
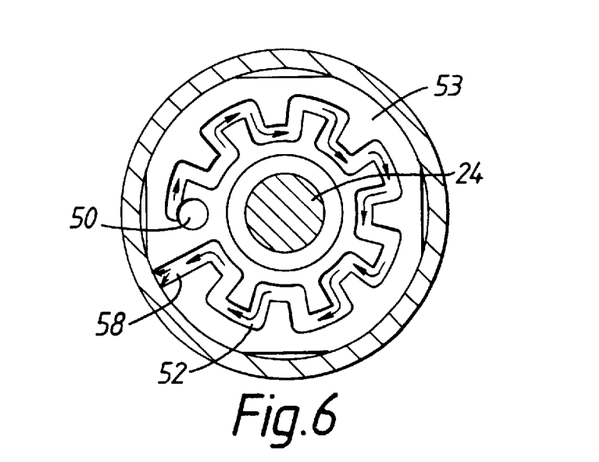
FIG. 6 is a section on the line VI—VI of FIG. 1.

An axially directed bore 50 extends from the face 42 to the opposite axial end of the piston body 28 where it opens into a labyrinthine passageway 52 (see FIG. 6). The passageway 52 is in fact formed by a zig-zag channel formed in the face 53 of the piston body 28, but this channel is closed off by a circular plate 54 which is held in position by a rivet 56 (FIG. 1). The passageway 52, closed off by the plate 54, leads to an open end 58 (FIG. 6) which is in turn in communication with a chamber 60 (FIG. 1) via the gap between the periphery of the plate 54 and the inner surface of the cylinder 10.

The bore 50 is open at its end 50A in the face 42 of the piston body 28. In addition, a narrow radially directed channel 62 (see FIGS. 2 also) connects the open end of the bore 50 to a space 64 around the free end of the piston body 28.

Figure 3:
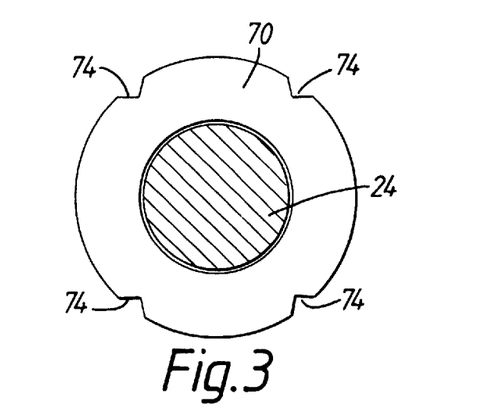
FIG. 3 is a section on the line III—III of FIG. 1.

The gas spring also includes a second or damping piston 70. The piston 70 is freely slidable on the piston rod 24 and is urged to the position shown in FIG. 1 by a compression spring 72, one end of which is located in a recess in the abutment 22 and the other end of which is located in a recess in a piston 70. The piston 70 closely though not sealingly slides within the cylinder 10. It is provided with four (in this example) axially directed grooves 74 arranged around its periphery (see FIG. 3).

During manufacture, the interior of the cylinder 10 is charged with gas under pressure and also with some oil. The oil is shown at 76. The amount of oil may be varied, as will be explained.

In addition to the chamber 60, the cylinder also contains a chamber 78 positioned between the face 42 of the piston 26 and the adjacent face 79 of the damping piston 70, and a chamber 80 positioned between the damping piston 70 and the abutment 22.

Chamber 78 is in communication with the space 64. Obviously, the relative sizes of the chambers will vary according to the positions of the pistons 26 and 70 as will be described.

Chambers 60 and 78 are interconnected at least through the bore 50 and the labyrinthine passage 52, and the chambers 78 and 80 are connected through the grooves 74.

The operation of the gas spring of FIG. 1 will now be considered.

Figure 4:
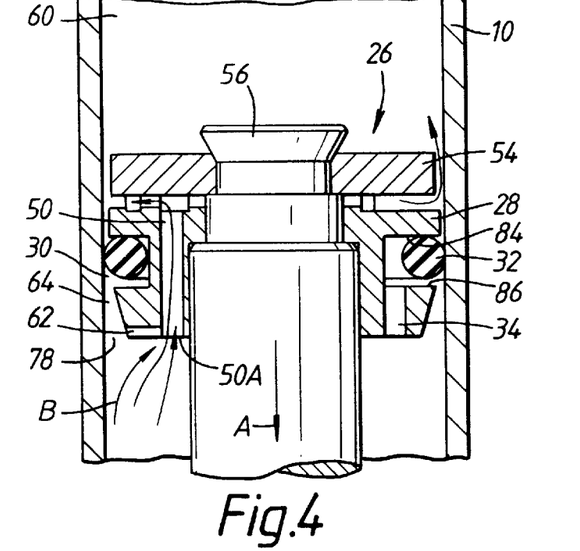
FIG. 4 shows the flow of fluid through a piston in the gas spring of FIG. 1 during outward movement of the piston rod.

The gas pressure within the cylinder 10 exerts a force on the inner end of the piston rod 24, tending to move it in an outward direction, that is, the direction A. As the piston rod, and thus the piston 26, move in this direction, friction between the sealing ring 32 and the inside wall of the cylinder 10 forces the sealing ring into sealing contact with the surface 84 of the groove 30 as shown in FIG. 4. The arrows B in FIG. 4 show how the pressurised gas transfers from chamber 78 into chamber 60 during this movement, the gas being compelled to flow through the labyrinthine passage 52. The speed of movement of the piston rod is thus controlled by the dimensions of the labyrinthine passageway and can be designed to be appropriate to the particular application.

During this transfer of gas pressure, corresponding transfer of gas from chamber 80 to chamber 78 (FIG. 1) takes place through the grooves 74 in the damping piston 70.

As the piston 26 continues to move, its face 42 will come in contact with the face 79 of the damping piston 70. This contact will close off the end 50A of the bore 50. Now, gas pressure can only transfer from chamber 78 into chamber 60 through the narrow feed channel 62. The speed of movement is significantly reduced. Continued movement of the piston rod is thus now controlled principally by the dimensions of the narrow feed channel 62 and also by the characteristics of the spring 72 which becomes progressively compressed as the movement of the piston 26 drives the damping piston 70 towards the abutment 22. If the quantity of oil 76 in the cylinder 10 is sufficient, some of this oil will then transfer from chamber 80 into chamber 78, through the grooves 74 in the damping piston 70, and thence through narrow feed channel 62, bore 50 and the labyrinthine passage 52, into chamber 60, providing further speed reduction. Piston 26 then forces piston 70 into contact with the abutment 22, and further piston movement stops.

Such controlled movement of the piston rod 24 in the direction of the arrow A may be used to open or raise a door or lid in a motor vehicle. The fixture 14 may be connected to the vehicle's body and the free end of the piston rod 24 may be connected to the door or lid. The presence of the damping piston 70 and its effect in closing off the end of the bore 50, so as to force the transferring gas (or liquid) to pass through the narrow feed channel 62, enables the speed of movement of the piston rod to be varied during its travel. In this way, for example, rapid initial movement can be obtained, followed by slower movement ending in a smooth rather than an abrupt stop.

Figure 5:
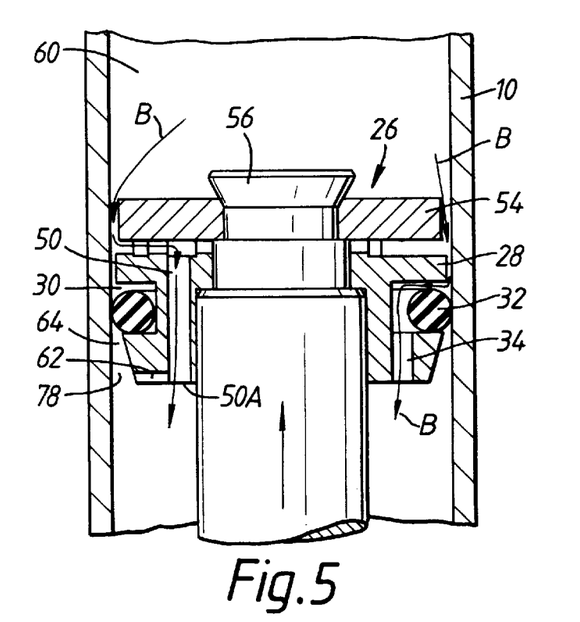
FIG. 5 corresponds to FIG. 4 but shows the flow of fluid during return movement of the piston rod.

Return movement of the piston rod 24 (that is, movement in the direction opposite to the direction of the arrow A) is normally carried out by the application of manual closing force to the door or lid controlled by the gas spring. As shown in FIG. 5, the frictional force acting on the sealing ring 32 moves the sealing ring axially out of contact with the surface 84 and into contact with the surface 86 of the groove 30. Gas can now transfer substantially freely from chamber 60 into chamber 78 by passing around the periphery of the piston body 28, past the sealing ring 32 and thence through the bores 34, 36, 38 and 40. In addition, gas can also flow into the labyrinthine passageway 52 through its opening 58 and into chamber 78 through the bore 50. During at least the initial part of the return movement of the piston rod 24, the damping piston 70 will be in contact with the face 42 of the piston body 28 and will close off the end 50A of the bore 50. The returning gas flowing through bore 50 will thus be forced to pass along the narrow feed channel 62. In addition, the bores 34 and 40 will be closed off by their contact with the face 79 of the damping piston 70. However, this will not have any significant effect on the return speed of the piston rod 24, because sufficient connection between chambers 60 and 78 is provided through the bores 36 and 38.

When the return movement of the piston rod 24 has become sufficient, the damping piston 70 will reach the limit of its travel (defined by the maximum length of the compression spring 72), and the piston 26 will then move away from the now-stationary damping piston 70. Continued gas transfer can now take place through the bores 34 and 40, as well as the bores 36 and 38, and through the now-open end 50A of the bore 50.

FIGS. 7, 8, 9 and 10 show how the gas spring can be given different speed characteristics according to the proportions of gas and oil within it.

Figure 7:
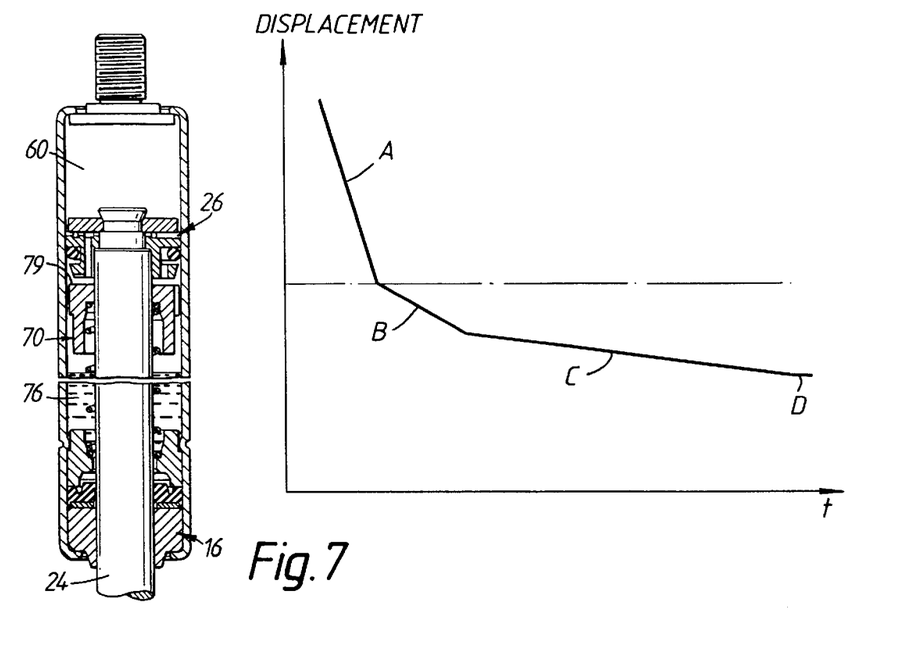
FIG. 7 diagrammatically shows the gas spring of FIG. 1 to a reduced scale having a certain proportion of gas and oil within it, and also shows a graph illustrating the speed of movement of the piston rod over different parts of its travel.

FIG. 7 diagrammatically shows the gas spring of FIG. 1 and illustrates the case where the level of the oil 76 is less than the face 79 of the damping piston 70. The graph in FIG. 7 has a portion A showing a relatively rapid speed of outward movement of the piston rod 24 during the time for which the piston 26 is clear of the damping piston 70. Over a period shown by the curve B. the speed of piston rod movement is reduced because the face 42 of the piston body 28 has come into contact with the face 79 of the damping piston 70, thus closing off the end 50A of the through bore 50 as explained above. After further outward movement of the piston rod, the oil, instead of the gas, now starts to transfer from chamber 80 into chamber 78 and possibly through piston 28 into chamber 60. The speed is further reduced as shown by curve C, until the piston rod comes to rest at the point D.

Figure 8:
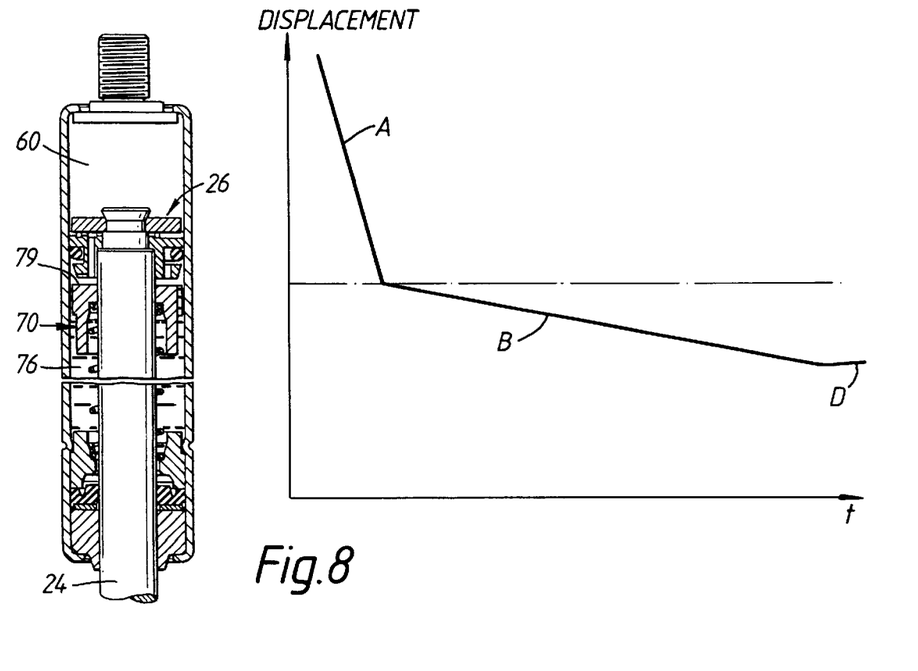
FIGS. 8, 9 and 10 correspond to FIG. 7 but show different proportions of gas and oil in the gas spring and the correspondingly different speeds of movement.

FIG. 8 shows the case where the oil fills the interior of the cylinder up to the level of the face 79 of the damping piston 70 when the latter is in its innermost position. Over the region indicated by the curve A in FIG. 8, the speed of outward movement of the piston rod 24 is relatively rapid (corresponding to the speed shown by curve A in FIG. 7), because the piston 26 is clear of the damping piston 70.

However, when the face 42 of the piston 26 comes into contact with the face 79 of the damping piston 70, not only is the end 50A of the through bore 50 closed off, but continued movement of the piston rod requires transfer of oil, not gas, into chamber 60. The speed of outward movement of the piston rod is thus reduced as shown by curve B in FIG. 8, until the piston rod comes to rest at the point D.

Figure 9:
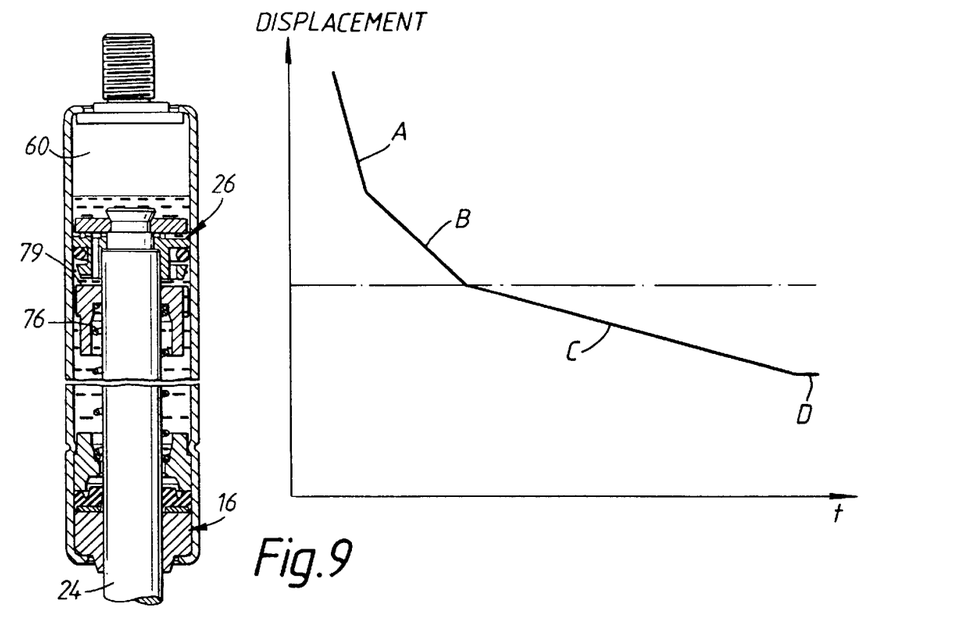

FIG. 9 illustrates the case where the level of oil 76 within the cylinder is above the face 79 of the damping piston 70 when it is in its innermost position. Curve A in FIG. 9 shows that the piston rod 24 moves outwardly at relatively high speed for a short time, while gas is transferred from chamber 78 to chamber 60, piston 26 being clear of piston 70. Curve B illustrates the reduced speed which occurs when the face 42 of the piston 26 comes below the level of the oil 76, the oil now flowing through the labyrinthine passage.

When the face 42 of piston 26 comes into contact with face 79 of damping piston 70, the speed is now further reduced as shown by curve C, because the open end 50A of the through bore 50 is closed off, and the oil is forced to flow through the narrow feed passage 62. The piston rod comes to rest at point D when the damping piston 70 reaches the abutment 22.

Figure 10:
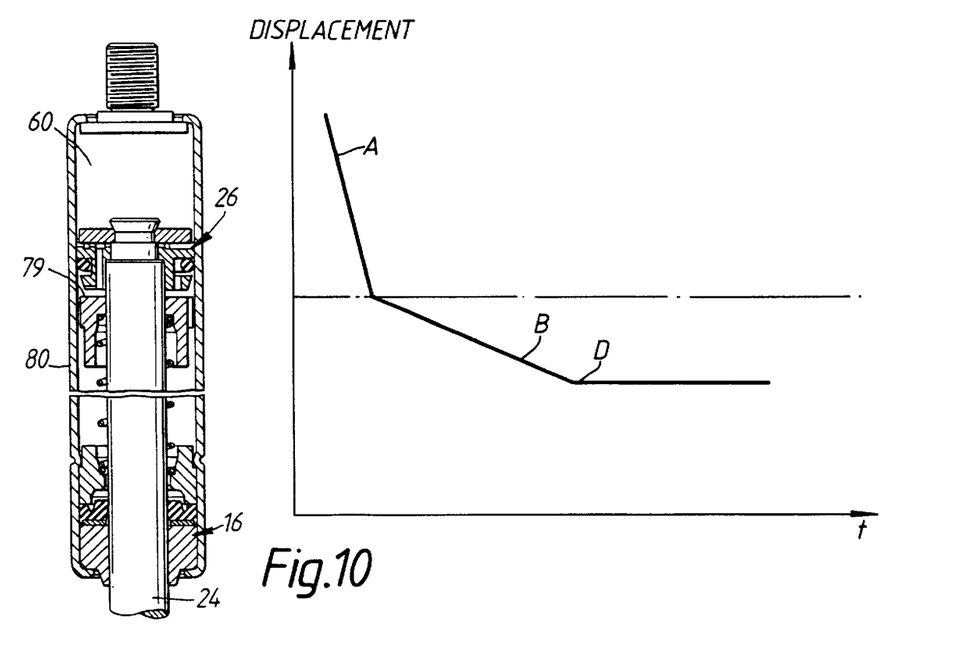

FIG. 10 shows the case where there is no oil within the cylinder 10. Curve A corresponds to relatively rapid speed of outward movement of the piston rod while the piston 26 is clear of the damping piston 70. When the face 42 of the piston 26 comes into contact with the face 79 of the piston 70, the speed is reduced as shown by curve B. The piston rod comes to rest at point D when the damping piston 70 comes into contact with the abutment 22.

Figure 11:
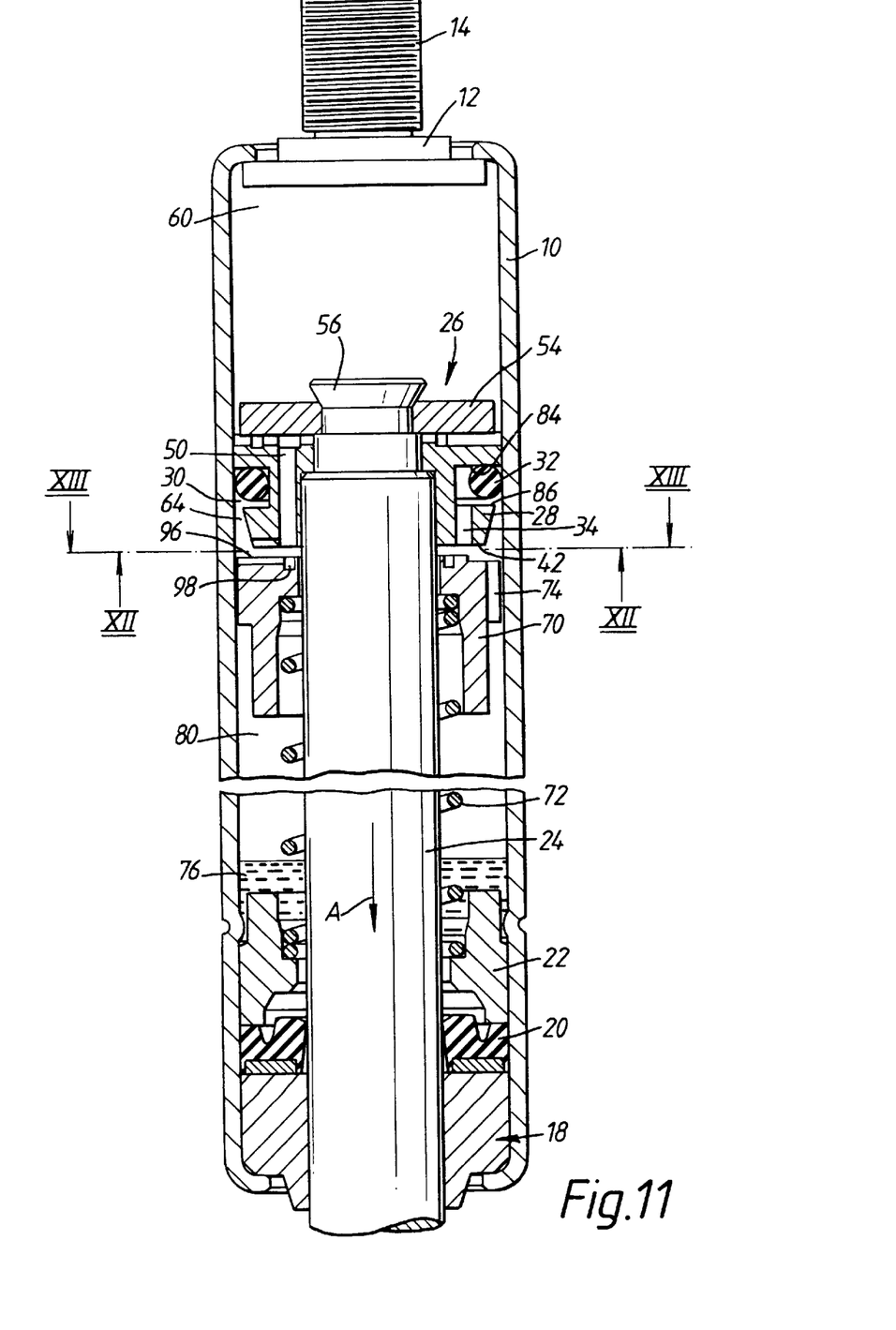
FIG. 11 is a longitudinal cross-section through another of the gas springs embodying the invention on the line XI—XI of FIG. 12.
Figure 12:
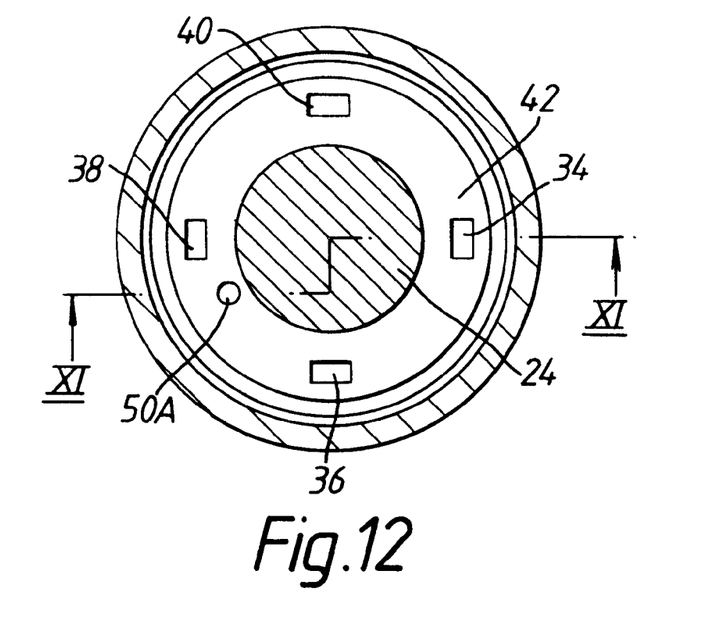
FIG. 12 is a section on the line XII—XII of FIG. 11.
Figure 13:
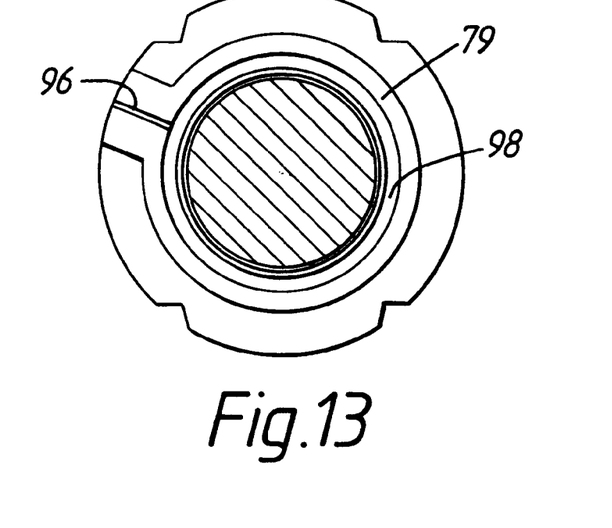
FIG. 13 is a section on the line XIII—XIII of FIG. 11.

FIGS. 11,12 and 13 show a modified form of the gas spring of FIG. 1. Items in FIGS. 11,12 and 13, corresponding to those in the other Figures are correspondingly referenced.

In the gas spring of FIGS. 11,12 and 13, the face 42 of the piston body 28 is not provided with the narrow radially directed feed channel 62.

Instead, a similar radially directed narrow feed channel 96 is formed in the face 79 of the damping piston 70. As shown in FIG. 13, this feed channel 96 leads into a circular channel 98 which is radially positioned so as to be in communication with the open end 50A of the through bore 50 in piston 28 when the face 42 of the piston 28 is in contact with the face 79 of the damping piston 26.

Figure 2:
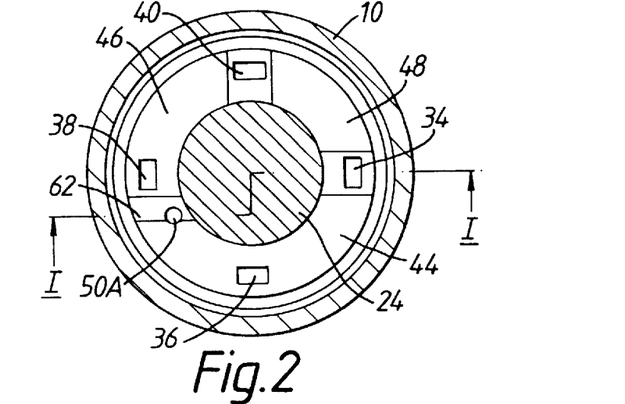
FIG. 2 is a section on the line II—II of FIG. 1.

In addition, the end face 42 of piston body 28 is not provided with the recessed portions 44, 46 and 48 shown in FIG. 2. Instead, the end 79 of the damping piston 70 is provided with a recessed portion 100.

It will be apparent that the operation of the gas spring of FIGS. 11,12 and 13 is the same as the gas spring shown in FIG. 1. In other words, the provision of the damping piston 11 and the narrow feed channel 96 enables the outward movement of the piston rod 24 to be controlled so as to be relatively rapid at the beginning of its travel, then reducing when the face 42 of piston body 28 comes into contact with face 79 of the damping piston 70.

What is claimed is:

1. A gas spring, comprising
   a cylindrical body with a hollow interior containing a fluid which at least partly includes gas under pressure,
   first piston means slidable within the interior and dividing the interior into a first chamber on one side of the first piston means and a second chamber on the opposite side of the piston means,
   a piston rod carried by the first piston means and passing through the second chamber and extending sealingly outwardly of the cylindrical body such that the gas pressure within the cylindrical body tends to move the piston rod outwardly of the cylindrical body,
   means defining fluid passageway means past the first piston means for allowing gas pressure to transfer from the second chamber to the first chamber at a predetermined controlled rate during a first part of the outward travel of the piston rod, the fluid passageway means being open to the second chamber through a face of the first piston means in the second chamber, and control means within the cylindrical body which is separated from the first piston means during the first part of the outward travel of the piston rod and which has a face into contact with which the said face of the piston means moves during a second part of the outward travel of the piston rod so as at least partially to close the fluid passageway means, the contacted faces of the control means and the first piston means defining a subsidiary passage of reduced and predetermined cross-section which becomes connected between the second chamber and the fluid passageway means, whereby to cause reduced speed of travel of the piston rod during the second part of its outward travel.

2. A gas spring according to claim 1, in which the fluid includes oil.

3. A gas spring according to claim 1, in which the control means comprises a control member biassed into a predetermined datum axial position within the cylindrical body so as to define the junction between the first and second parts of the outward travel of the piston rod.

4. A gas spring according to claim 3, in which the control member comprises second piston means in the cylindrical body which is slidable with respect to the piston rod.

5. A gas spring according to claim 3, in which the subsidiary passage extends within the first piston means from the fluid passageway means and in a direction towards the cylindrical body to an opening which opens into the second chamber.

6. A gas spring according to claim 1, in which the subsidiary passage is formed in the said face of the control means so as to be connected to the open end of the fluid passageway in the first piston means when the said contact is achieved, the subsidiary passage leading to the second chamber.

7. A gas spring according to claim 5, in which the subsidiary passage extends radially of the cylindrical body.

8. A gas spring according to claim 3, in which the fluid includes oil, and in which, when the control means is in the datum position, the oil at least partly fills the second chamber.

9. A gas spring according to claim 8, in which, when the second piston means is in the datum position, the oil fills the second chamber.

10. A gas spring according to claim 9, in which the fluid includes oil, and in which, when the control member is in the datum position and the said contact is achieved, the oil fills the second chamber and extends into the first chamber.

11. A gas spring according to claim 3, including a resilient abutment contacted by the control member when the piston rod reaches the limit of its outward travel.

12. A gas spring according to claim 1, in which the first piston means includes valve means operative when the piston rod moves in the return direction to open a further fluid passageway permitting relatively free transfer of fluid from the first chamber to the second chamber.

13. A gas spring according to claim 1, in which the fluid passageway includes a labyrinthine portion for limiting the flow of fluid therethrough.

14. A gas spring, comprising a cylindrical body having a hollow interior, first piston means slidable within the cylindrical body between first and second ends thereof and dividing the cylindrical body into a first chamber and a second chamber, a piston rod attached to the first piston means and extending through the second chamber and sealingly outwardly of the cylindrical body through the second end thereof, the cylindrical body containing fluid which at least partly includes gas under pressure and which tends to move the piston rod in a direction outwardly of the cylindrical body, the first piston means including means defining a first fluid passageway connecting the first and second chambers to permit transfer of the fluid from the second chamber to the first chamber as the gas pressure moves the piston rod outwardly of the cylindrical body, second piston means mounted on and slidable relative to the piston rod in the second chamber and biassed away from the second end of the cylindrical body so as to divide the second chamber into first and second parts thereof which are interconnected via the second piston means, the first fluid passageway having an opening in a face of the first piston means which opens into the first part of the second chamber to allow relatively rapid transfer of fluid from the second chamber into the first chamber during an initial part of the outward movement of the piston rod, the effective cross-sectional area of this opening being reduced to a predetermined size when the said face of the first piston means comes into contact with the second piston means so as to reduce the rate of transfer of fluid from the second chamber to the first chamber during the second part of the outward movement of the piston rod, and valve means carried by the first piston means for opening a second fluid passageway when the piston rod moves inwardly of the cylindrical body to allow relatively free flow of fluid from the first chamber to the second chamber when the piston rod moves in the inward direction.

15. A gas spring according to claim 14, including a flow control passage extending within the first piston means from the first fluid passageway in a direction towards the cylindrical body and having the reduced cross-sectional area of predetermined size, the fluid which transfers from the second chamber to the first chamber when the open end of the first fluid passageway is closed off during the second part of the outward movement of the piston rod being forced to flow through this flow control passage.

16. A gas spring according to claim 14, in which the first fluid passageway has an open end in the said face of the first piston means so as to be at least partially closed by the said contact.

17. A gas spring according to claim 16, in which the open end of the first fluid passageway is completely closed off by the said contact, the first fluid passageway being open to a flow control passage of the reduced cross-sectional area of predetermined size which is not closed off by the contact.

18. A gas spring according to claim 17, in which the flow control passage extends substantially radially within the first piston means from the fluid passageway to an opening which opens into the second chamber.

19. A gas spring according to claim 14, in which the first fluid passageway has an open end in the said face of the first piston means, and including a flow control passage of the reduced cross-sectional area of predetermined size which is formed in the second piston means so as to be connected to the open end of the first fluid passageway in the first piston means when the said contact is achieved, the flow control passage leading to the second chamber and the open end of the first fluid passageway being otherwise closed by the said contact.

20. A gas spring according to claim 14, including a resilient abutment contacted by the second piston means when the piston rod reaches the limit of its outward travel.

21. A gas spring according to claim 14, in which the first fluid passageway includes a labyrinthine portion for limiting the flow of fluid therethrough.

22. A gas spring according to claim 14, in which the fluid includes oil.

* * * * *